Feb. 27, 1968    T. GASSINO    3,370,788
PROGRAM CONTROL DEVICE FOR A CALCULATING OR LIKE MACHINE
Filed March 14, 1966    6 Sheets-Sheet 1

INVENTOR.
TERESIO GASSINO
BY John Toggenburger
AGENT

Feb. 27, 1968     T. GASSINO     3,370,788

PROGRAM CONTROL DEVICE FOR A CALCULATING OR LIKE MACHINE

Filed March 14, 1966     6 Sheets-Sheet 4

INVENTOR.
TERESIO GASSINO
BY *John Toggenburger*
AGENT

Feb. 27, 1968　　　　　T. GASSINO　　　　　3,370,788
PROGRAM CONTROL DEVICE FOR A CALCULATING OR LIKE MACHINE
Filed March 14, 1966　　　　　　　　　　　6 Sheets-Sheet 5

INVENTOR.
TERESIO GASSINO
BY John Toggenburger
AGENT

INVENTOR.
TERESIO GASSINO
BY John Toggenburger
AGENT

United States Patent Office 3,370,788
Patented Feb. 27, 1968

3,370,788
PROGRAM CONTROL DEVICE FOR A
CALCULATING OR LIKE MACHINE
Teresio Gassino, Ivrea (Turin), Italy, assignor to Ing. C.
Olivetti & C., S.p.A., Ivrea, Italy, a corporation of
Italy
Filed Mar. 14, 1966, Ser. No. 533,974
Claims priority, application Italy, Mar. 31, 1965,
7,280/65
12 Claims. (Cl. 235—62)

ABSTRACT OF THE DISCLOSURE

A program control device for a calculating machine comprises a cam shaft adapted to be located in a plurality of operative stations to control in any station predetermined machine functions. The cam shaft is moved through a clutch and is arrested in a sequence of stations determined by a key depressed at the beginning of the sequence by a set of selectable elements cooperating with a set of variably toothed disks secured to the shaft, said elements upon having arrested said shaft being also adapted to disengage said clutch.

This invention relates to a program control device for a calculating machine comprising a support adapted to be located in a plurality of operative stations to control in any station predetermined machine functions, and means for moving said support through said stations.

There are known calculating machines wherein the various machine functions of some specific sequences of operations, for example for effecting a multiplication or a division, are controlled by a program device. In a known machine the program control device comprises a cam shaft adapted to be previously located either into a first transverse position to predispose the machine for effecting a multiplication, or into a second transverse position to predispose the machine for effecting a division. In each one of the two transverse positions the cam shaft is then rotated step by step and is successively arrested in five different angular positions corresponding to five different cycles of the machine.

However, this device has the disadvantage of being unadapted to control sequences of operations different than the multiplication and division. Furthermore, the device is relatively intricate because the two sequences of cycles for the multiplication and the division comprise similar cycles, such as for setting up the factors and for taking the total, whereas the cam shaft must be provided in any case with two complete sets of cams for said two operations.

These and other disadvantages are obviated by the program control device according to the invention, which is characterized by means manually operable for starting a sequence of machine operations, said operable means being adapted to select at least one element for sequentially arresting said support in each one of a group of predetermined stations of said plurality, said element being also adapted to render each time said moving means ineffective.

This and other characteristics of the invention will become apparent from the following description of a preferred embodiment thereof, and from the accompanying drawings, wherein:

Figure 1:
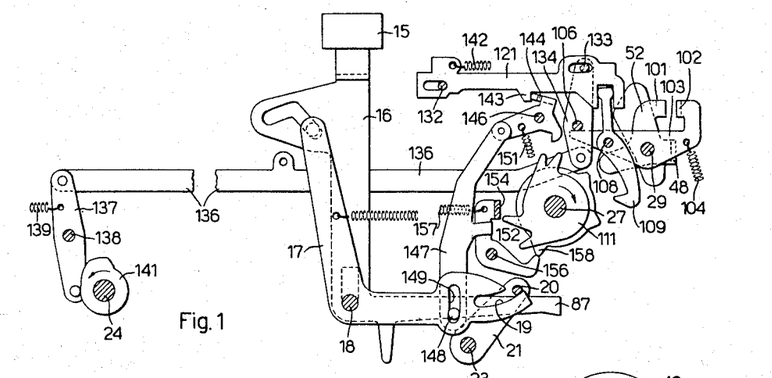
FIG. 1 is a left hand partial longitudinal sectional view of a program control device according to the invention, incorporated in a calculating machine.

The program control device is incorporated in a calculating machine of the type described in the United States patent application, Serial No. 506,958 filed on Nov. 9, 1965, now U.S. Patent No. 3,331,556. The calculating machine comprises a set of function control motor, keys, of which only a multiplication key 15 is shown in FIG. 1. Each key is provided with a stem 16 pin and slot connected with a lever 17 fulcrumed on a stationary shaft 18. The lever 17 is provided with a notch 19 cooperating with a common starting member formed of a universal bar 20 carried by two crank levers 21 and 22 (FIG. 3) secured to a shaft 23 rotatably mounted on the machine frame.

The shaft 23 (FIG. 1) when rocked counterclockwise starts a cyclically operating mechanism comprising a cycle of a first shaft 24, which causes the shaft 23 to be additionally rocked counterclockwise for actuating some functions predisposed by the depressed key. Therefore, the shaft 24 will be called thereinafter servo-motor shaft. Near the middle of the cycle, the shaft 24 starts a cycle of a second shaft 25 (FIG. 2), which is rotated bodily with a sleeve 26 and will be called herein after auxiliary shaft. The auxiliary shaft 25 and the sleeve 26 are temporarily stopped upon being rotated 270 degrees, thus effecting a first part of an auxiliary cycle.

Simultaneously, a main shaft not shown in the drawings is started for one or more cycles, said main shaft being adapted to control the conventional actuators 203 (FIG. 8) of the machine. When the main shaft is stopped, the auxiliary shaft 25 and the sleeve 26 are started again for completing their revolution, thus effecting a second part of the auxiliary cycle. The whole formed of a cycle of the servo-motor shaft 24, a cycle of the auxiliary shaft 25 and a cycle of the main shaft represent one machine operation. The auxiliary shaft 25 may also be rotated, independently from the servo-motor shaft 24, the sleeve 26 and the main shaft, by depressing each one of a set of numerical keys not shown in the drawing, and adapted to set up an amount order by order.

Figure 4:
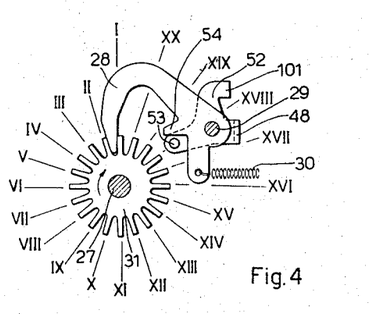
FIG. 4 is a left hand view of a detail of the device.
Figure 13:
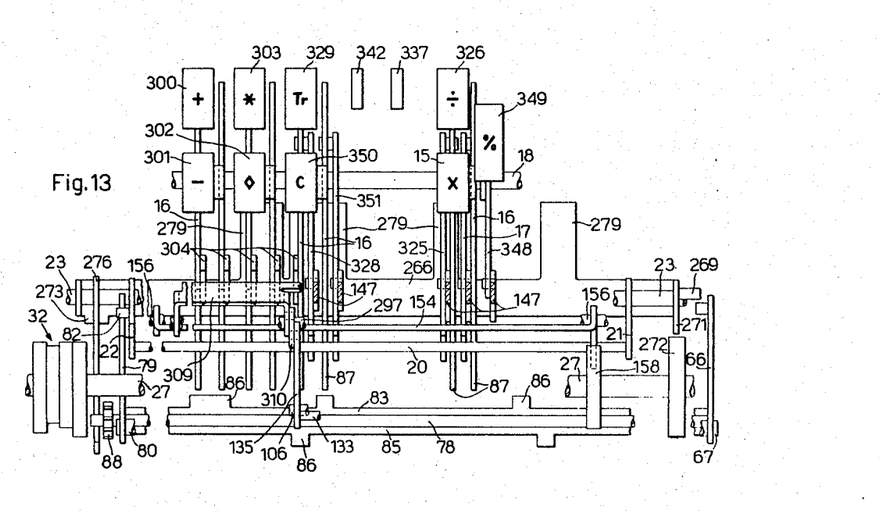
FIG. 13 is a partial plan view incorporating the details of FIGURES 11 and 12.

The program control device comprises a support formed of a shaft 27 rotatably mounted on the machine frame and adapted to be located in a plurality of twenty angular stations called I, II . . . XX (FIG. 4). In each one of these stations the shaft 27 is latched by a latch 28 fulcrumed on a stationary shaft 29 and cooperating with a wheel 31 having twenty teeth. The wheel 31 is secured to the shaft 27, which carries also a number of cams generically indicated by 32 (FIG. 13), each adapted to selectively control in each station of the shaft 27 a specific machine function, in a manner which will be described later.

Secured to the shaft 27 is also a bevel gear 33 (FIG. 2) meshing with a second bevel gear 34 rotatably mounted on a longitudinal shaft 36, which is continuously rotated in a known manner by the conventional electric motor of the machine not shown in the drawings. The shaft 27 is adapted to be rotated by the shaft 36 through a clutch 38, 39 adapted to be engaged by axially shifting a sleeve 37. To this end a groove of the sleeve 37 is engaged by a roller 42 rotatably mounted on a bent lug of a slide 43 slidable on a stationary pin 44. The slide 43 is also pivoted at 46 on an arm 47 of a bail 48 fulcrumed on the shaft 29. The arm 47 is also provided with a pin 49 cooperating with a spring urged locking member 50 fulcrumed at 51 on the same slide 43. A second arm 52 of the bail 48 (FIG. 4) is provided with a pin 53 adapted to cooperate with a projection 54 of the latch 28.

The program control device is also provided with a conditioning device predisposable according to the station each time occupied by the shaft 27. More particularly, said conditioning device comprises a shaft 78 (FIG. 13) rotatably mounted on a pair of levers 66 and 79 pivoted on a corresponding pair of pivots 67 and 80. The lever 79 (FIG. 3) is normally urged by a spring 81 to contact a pin 82 of the lever 22, whereas the lever 66 (FIG. 2) is pin and slot connected with a pawl 64 fulcrumed at 63 on the arm 47. A shoulder 68 of the pawl 64 is adapted to cooperate with a pin 69 of a lever 71 rotatably mounted on the shaft 23 and connected through a link 72 to a lever 73 fulcrumed at 74. The lever 73 is normally urged by a spring 76 to contact a cam 77 secured to the sleeve 26.

Secured to the shaft 78 (FIG. 2) are three variably toothed bars 83, 84 and 85 mutually distanced 90 degrees. More particularly each bar 83, 84 and 85 is provided with teeth 86 (FIG. 13) variably arranged thereon, and is selectable for sensing a projection 87 (FIG. 2) provided on each key stem 16. Secured to the left end of the shaft 78 is also a pinion 88 (FIG. 3) meshing with a toothed sector 89 fulcrumed at 91 on the lever 79. Fulcrumed on the sector 89 is a link 92 provided with a slot 93 engaging a pin 94 of a lever 95 fulcrumed on a stationary shaft 96. A spring 98 connecting the lever 95 with the link 92 normally urges the lever 95 to contact a cam 99 of the program shaft 27 and the pin 94 to contact the upper end of the slot 93 of the link 92.

The arm 52 of the bail 48 (FIG. 1) is provided with a projection 101 adapted to cooperate with a lug 102 of a lever 103 fulcrumed on the shaft 29 and normally urged by a spring 104 to contact a shaft 106 rotatably mounted on the machine frame. A shaft 108, secured to the lever 103 and to a second lever 107 (FIG. 5) fulcrumed on the shaft 29, rotatably mounts a set of elements formed of ten latches 109, each one adapted to cooperate with a corresponding toothed disk 111, 112 . . . 120 secured to the shaft 27. Each disk 111 to 120 (FIG. 1) is differently toothed according to a group of predetermined stations, wherein the shaft 27 must be stopped under the control of the corresponding latch 109.

The latches 109 are individually connected with a corresponding slide 121, 122 . . . 130 (FIG. 5) slidably mounted on a common stationary shaft 132 (FIG. 1) and on a universal bar 133 secured to a pair of levers 134 and 135 (FIG. 5) secured to the shaft 106. The lever 134 is connected through a link 136 to a lever 137 (FIG. 1) fulcrumed at 138 and normally urged by a spring 139 to contact a cam 141 of the servo-motor shaft 24. The slides 121–130 (FIG. 6) are urged forward each one by a spring 142, but they are normally locked against the urge of the springs 142 by a group of locking members 144, 322, 324, 327, 345, 341 (FIG. 7), 333 and 358 each one controlled by a corresponding key. For example, as it will be better seen hereinafter, the slides 121, 122, 123 and 124 are provided each one with a shoulder 143, contacting a bail 144 fulcrumed at 146. The bail 144 is linked with a link 147 (FIG. 1) having a pin 148 engaging a slot 149 of the corresponding lever 17. The bail 144 under the urge of a spring 151 normally causes the slides 121–130 to contact the stationary shaft 132, the springs 151 prevailing over the springs 142 of the slides 121–124.

The various links 147 are provided each one with a projection 152 adapted to cooperate with a locking bail 154 fulcrumed at 156 and normally urged by a spring 157 to contact a cam 158 of the program shaft 27. The projections 152 may have one of two different lengths (see FIG. 6). The cam 158 (FIG. 1) is adapted to rock the bail 154 counterclockwise to one of two different positions, in one of which it locks only the long projections 152, while in the other position it locks both the long and the short projections 152.

Slidably mounted on the shaft 132 and on the universal bar 133 is also a slide 159 (FIG. 3) similar to the slides 121–130, but normally urged by a spring 161 to contact the bar 133. The slide 159 is connected to a latch 162 also fulcrumed on the shaft 108 and normally located in an effective position to arrest a corresponding disk 163 secured to the program shaft 27. The disk 163 is provided with a single tooth located in correspondence with the station I of the shaft 27.

The program control device operates as follows.

Upon depressing a motor key, for example the key 15 (FIG. 1), the corresponding lever 17 on one hand through the universal bar 20 rocks the crank levers 21 and 22 (FIG. 3) for starting the cycle of the servo-motor shaft 24 (FIG. 1), on the other hand through the pin 148 displaces the link 147 upwards thus rocking the bail 144 clockwise. The bail 144 releases thus a corresponding group of slides 121–130. The released slides are moved forward by the corresponding springs 142 and locate the latches 109 connected thereto into the path of the teeth of the corresponding disks 111–120.

Simultaneously the key stem 16 brings the projection 87 into the path of the bar 83 (FIG. 2) of the shaft 78. At the beginning of the cycle of the shaft 24 (FIG. 1) the cam 141 rocks the lever 137 clockwise, whereby the link 136 rocks the lever 134 counterclockwise bodily with the bar 133. This latter temporarily displaces the slides 121–130 and 159 (FIG. 5) rearward, whereby temporarily returns the latches 109 in the ineffective position of FIG. 1. The latches 109 and 162 (FIGS. 1 and 3), which in the case the program shaft 27 has been rotated during the next preceding cycle of the shaft 24 arrested the shaft 27, are thus unlatched from the disks 111–120 and 163.

Figure 2:
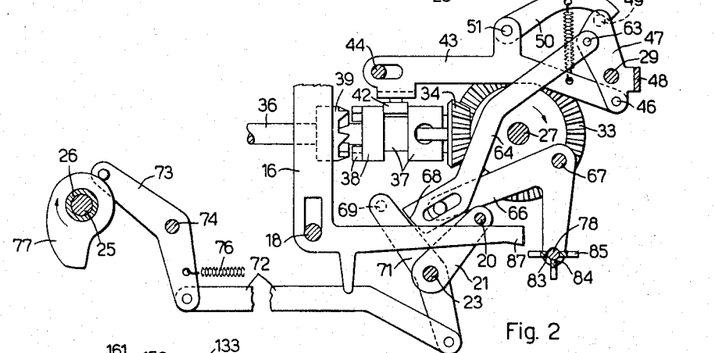
FIG. 2 is another left hand partial longitudinal sectional view of the device.
Figure 3:
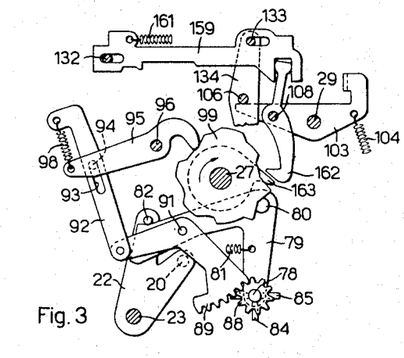
FIG. 3 is another left hand partial longitudinal sectional view of the device.

Thereafter the cam 141 of the shaft 24 restores the bar 133, whereby the spring 161 restores the slide 159 to the position of FIG. 3, thus returning the latches 109 and 162 into the path of the teeth of the disks 111–120 and 163. Simultaneously, the universal bar 20 is additionally displaced counterclockwise in the manner described in the cited patent application. Now the bar 20 additionally rocks the lever 17 (FIG. 3) counterclockwise. The pin 82 of the crank lever 22 releases thus the lever 79, which causes the shaft 78 bodily with the bars 83, 84 and 85 to sense under the urge of the spring 81 the projection 87 (FIG. 2) of the stem 16 of the depressed key.

In the station I of the program shaft 27, the cam 99 (FIG. 3) through the lever 95, the link 92, the sector 89 and the pinion 88 holds the bar 83 in front of the projections 87 (FIG. 2) of the key stems. In the case the projection 87 of the stem 16 of the depressed key is located in front of a tooth 86 (FIG. 13) of the bar 83, this latter is immediately arrested and the lever 66 (FIG. 2) is unable to bring the shoulder 68 of the pawl 64 into the path of the pin 69. Therefore, the program control device remains unaffected even if a group of slides 121–130 has been released. On the contrary, if the projection 87 is located in front of a portion of bar 83 deprived of teeth 86 (FIG. 13), the bar 83 may be displaced rearward. The lever 66 (FIG. 2) is now rocked clockwise and brings the shoulder 68 into the path of the pin 69.

Thereafter the servo motor-shaft 24 starts one cycle of the auxiliary shaft 25 and the sleeve 26, which are now rotated clockwise. The cam 77 of the sleeve 26 upon being rotated 90 degrees begins to rock the lever 73 clockwise and through the link 72 rocks the lever 71 clockwise. Now the pin 69 engages the shoulder 68 of the pawl 64 and rocks the bail 48 clockwise. The bail 48 through the pin 53 (FIG. 4) of the arm 52 rocks the latch 28 in the same direction, thus releasing the wheel 31 of the shaft 27. Simultaneously, the arm 47 of the bail 48 (FIG. 2) displaces the slide 43 rearward. The roller 42 engages thus the clutch 38, 39 which through the bevel gear 34 rotates the bevel gear 33 clockwise bodily with the program shaft 27. The lug 101 of the bail 48 approaches now the lug 102 (FIG. 1) of the lever 103, while the bail 48 remains locked in the rocked position by the locking member 50 (FIG. 2).

The program shaft 27 rotates until the first tooth of one of the disks 111–120 (FIG. 1) encounters the corresponding rocked latches 109. The encountered latch 109 is thus displaced downward and rocks the lever 103 bodily with the shaft 108. Now the lug 102 (FIG. 1) of the lever 103, engages the projection 101 of the bail 48, which is restored counterclockwise. The arm 47 thus disengages the clutch 38, 39 by means of the slide 43 (FIG. 2), whereby the shaft 27 is arrested while the pin 53 (FIG. 4) causes the latch 28 to be restored counterclockwise and to latch the wheel 31 and the shaft 27 into the new station.

The first part of the cycle of the auxiliary shaft 25 is now followed by one or more cycles of the main shaft, the functions of which are controlled by the cams 32 (FIG. 13) according to the new station of the program shaft 27. Assuming that the shaft 27 has been stopped through the disk 111 (FIG. 1) in the station VI, the cam 158 of the shaft 27 causes the bail 154 to be rocked so as to lock only the long projections 152, whereby the link 147 corresponding to the key 15 is locked in raised position, even if it is manually released. The link 147 will remain in the raised position till the end of the sequence of the operations predisposed by the depressed key.

The bail 154 also prevents all other links 147 provided with a long projection 152 from being raised, and therefore the corresponding keys from being repressed, whereby only predetermined keys corresponding to links 147 provided with a short projection 152 or lacking of this projection may be depressed. Therefore the program states what keys are to be depressed according to the sequence started by the first depressed key. In other stations, for example in the station VII, the cam 158 rocks the bail 154 clockwise through a longer stroke and locks the links 147 having the long projection 152 as well as those having a short projection 152.

In the new station of the shaft 27, the cam 99 (FIG. 3) may alter the angular position of the lever 95. In the station VI the cam 99 rocks the lever 95 counterclockwise so as to cause the link 92 to locate through the sector 89 the pinion 88, and the shafts 78, the bar 84 in front of the projections 87 (FIG. 2) of the key stems 16. In other stations the cam 99 may rock the lever 95 through a longer stroke so as to locate the bar 85 in front of the projections 87.

Now, upon depressing a new motor key allowed by the program, the servo-motor shaft 24 (FIG. 1) through the bar 133 temporarily restores the slides 121–130 and 159 rearward, thus releasing the disk 111–120 from the corresponding latches 109, which arrested the program shaft 27.

The depressed key, even if allowed by the program, could not be a predetermined one required by the program to follow the program sequence. In this case its projection 87 is located in front of a tooth 86 of the new bar 84, whereby the displacement of the program shaft 27 is not affected. It is thus possible to effect some operations outside the program without affecting the sequence of operations controlled by the program, which can always be continued thereafter when the predetermined key required by the program will be depressed. The key required by the program has the projection 87 in front of a portion of the bar deprived of teeth 86, whereby upon the depression of said predetermined key, the program shaft 27 is again rotated in the manner seen before.

For each sequence of operation the program shaft 27 is sequentially stopped only in a group of the twenty possible stations. For example in the case of the sequence started by the key 15, the disk 111 arrests the program shaft 27 in the stations VI, VII, XII and XIV. In this case the shaft 27 will be arrested in the station I after a complete revolution by the latch 162 (FIG. 3), the slide 159 of which normally remains displaced forward. However it is possible to disable the latch 162 by a suitable control member in order to prevent the shaft 27 from being stopped in the station I and to accomplish some repeated sequences. Some disks 111–120 are however provided with a tooth for directly arresting the shaft 27 into the station I.

It is thus clear that the means 15, 17, 147 are manually operable for starting a sequence of machine operations and are adapted to select at least one element 109 for sequentially arresting the program support 27 in each one of a group of predetermined stations I–XX, said element being also adapted to render each time the clutch 38, 39 ineffective.

Some sequences of operations controlled by the program shaft 27 will now be described.

The slide 121 (FIG. 6) is called multiplication slide and is adapted to arrest the program in the stations VI, VII, XII and XIV. The slide 122 is called continued multiplication slide and is adapted to arrest the program in the station III. The slide 123 is called discount slide and is adapted to arrest the program in the station IX. The slide 124 is called multiplicand accumulation slide, and is adapted to arrest the program in the station VIII. The slide 125 is called dividend accumulation slide and is adapted to arrest the program in the station XI. The slide 126 is called rate slide and is adapted to arrest the program in the stations IV and V. The slide 127 is called division slide and is adapted to arrest the program in the stations X, XIII, XV, XVI, XVII, XVIII, XIX and I. The slides 128 and 129 are called quotient accumulation slide, and product accumulation slide respectively, and are both adapted to arrest the program in the station XX. Finally the slide 130 is called transfer slide and is adapted to arrest the program in the stations II and I.

The slides 121, 122, 123 and 124 (FIG. 6) normally contact through the projection 143 the bail 144, which is provided with a projection 321 engaging a bail 322 also fulcrumed on the shaft 146 and having a lug 323 normally contacting the slide 129. The slides 125, 126, 127 and 128 contact a bail 324 also fulcrumed on the shaft 146 and connected through one of the links 147 with a lever 325 pin and slot connected with the stem 16 of a division key 326. Finally the slide 130 normally contacts a lever 307 fulcrumed on the shaft 146 and connected through another link 147 to a lever 328. This latter is pin and slot connected with the stem 16 to a transfer control key 329.

The slides 124 and 125 (FIG. 7) are also provided with a projection 330 and 331 respectively, normally contacting a pin 332 of a lever 333 fulcrumed on a stationary shaft 334. The lever 333 is provided with a toothed sector 335 meshing with a toothed sector 336 carrying a manipulative member 337 for causing the first factor, that is the multiplicand or the dividend, to be accumulated into a totalizer of the machine. The slides 128 and 129 are each one provided with a projection 338, and 339 respectively, normally contacting a pin 340 of a lever 341 engaging a manipulative member 342 for causing the results, that is the products or the quotients, to be accumulated into another totalizer of the machine. The two slides 123 and 126 (FIG. 6) are each one provided with a projection 343 adapted to cooperate with a corresponding arm 344 secured to a sleeve 345 rotatably mounted on a stationary shaft 346. Another arm 347 also secured on the sleeve 345 is connected through one of the links 147 to a lever 348 pin and slot connected with the stem of a percent key 349, which is located adjacent the multiplication key 15 and the division key 326 for being depressed simultaneously therewith.

The stem of a continued multiplication key 350 (FIG. 7) cooperates with a lever 351, which through one of the links 147 is connected to a bail 352 fulcrumed on the shaft 346 and provided with a lug 353 adapted to cooperate with a projection 354 of the slide 122. The bail 352 is also adapted to engage a shoulder 355 provided on the slides 159, 124, 125, 128 and 129, the bail 352 being normally distanced therefrom. The links 147 of the keys 326 and 349 (FIG. 6) are also provided each one with a long projection 152. The links 147 concerning the keys 329 and 350 (FIG. 7) are each one provided with a short projection 152.

Finally, the calculating machine is provided with a conventional addition key 300 (FIG. 13), a subtraction key 301, a subtotal key 302 and a total key 303, which normally do not affect the program device.

When the program shaft 27 is located in the station I, the amount set up through the ten key keyboard may be processed by depressing any motor key. If either the addition key 300 (FIG. 13) or the subtraction key 301 is depressed the program remains unaffected.

Figure 6:
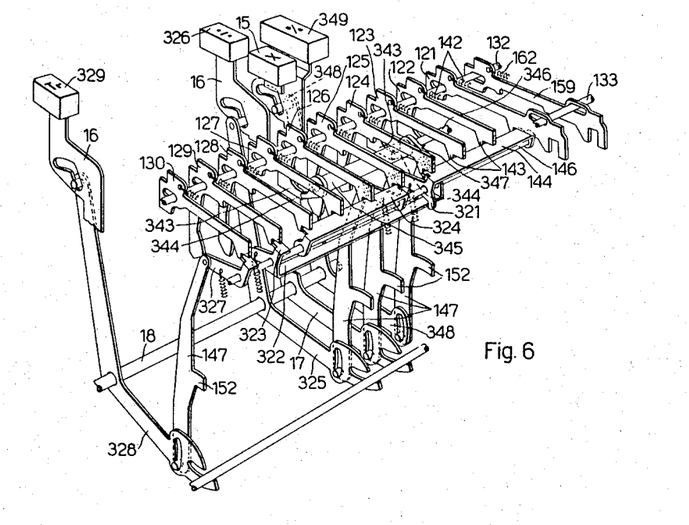
FIG. 6 is a partial prospective view of the device.
Figure 7:
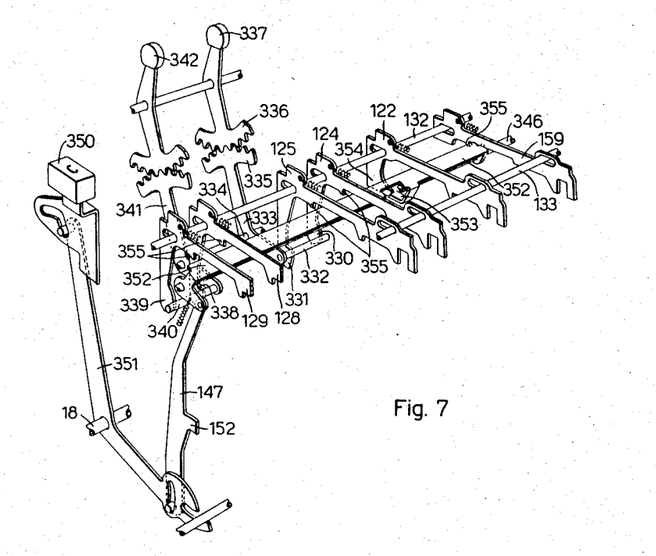
FIG. 7 is another partial prospective view of the device.

Assuming that the set up amount represents a multiplicand and that the levers 337 and 342 are both in the central position as in FIG. 7. Upon depressing the multiplication key 15 (FIG. 6) the corresponding lever 17 through the link 147 rocks the bail 144 clockwise as seen before. The slide 121 is now moved forward, while the slide 122 (FIG. 7) is locked by the lug 353 of the bail 352, the slide 123 (FIG. 6) is locked by the arm 344, the slide 124 (FIG. 7) is locked by the pin 332 of the lever 333, the slide 129 is locked by the pin 340 of the lever 341. The program shaft 27 (FIG. 1) is now sequentially arrested in stations VI, VII, XII and XIV. In said stations the cam 158 causes the link 147 of the key 15 in its raised position, whereby the slide 121 remains selected even if at the end of the machine cycle the key 15 will be restored. In the station VI the program shaft 27 controls the set up of the multiplier.

In this position the cam 99 (FIG. 3) selects the bar 84, which predetermines for prosecuting the program sequence either the addition key 301 (FIG. 13) if the positive multiplication is to be effected, or the subtraction key 301 if the negative multiplication is to be effected. Upon the manual depression of one of these two keys the program shaft 27 (FIG. 3) is displaced to the station VII predisposing the machine for automatically effecting the multiplication.

Thereafter, the program shaft 27 is displaced to the station XII and controls the printing of the multiplier. In the following cycle, the program shaft 27 is displaced to the station XIV which predisposes the machine for printing the product. Thereafter, the program shaft 27 is displaced again and is arrested in the station I by the latch 162 of the slide 159.

If the lever 337 (FIG. 7) is rocked counterclockwise before the depression of the key 15, the pin 332 of the lever 333 releases the slide 124 of the multiplicand accumulation. At the depression of the key 15 in addition to the multiplication slide 12, now also the slide 124 is moved forward. The slide 124 causes the program shaft 27 to be arrested in the station VIII in addition to the stations, wherein it is arrested under the control of the slide 121. In the station VIII the program causes the multiplicand to be accumulated into a machine totalizer. Similarly, if before the depression of the key 15 the lever 342 is rocked counterclockwise, the pin 340 of the lever 341 releases the slide 129 of the product accumulation. The slide 129 will then arrest the program shaft in the station XX, which controls the product accumulation into another machine totalizer.

Furthermore, if at the beginning of the multiplication the key 15 is depressed simultaneously with the percent key 349, this latter through its lever 348 and the corresponding link 147 rotates the sleeve 345, which causes the discount slide 123 to be displaced forward in addition to the multiplication slide 121. The slide 123 now stops the program shaft 27 into the station IX, wherein it controls the multiplicand accumulation into the same totalizer accumulating the product, which in this case represents the discount. In the station XIV the sum or the difference of the multiplicand with the discount calculated in the multiplication will be printed.

Finally, when the shaft 27 is located in the station VI, if the key 300 or the key 301 (FIG. 13) is depressed simultaneously with the continued multiplication key 350, this latter through the lever 351 (FIG. 7) and the corresponding link 147 rocks the bail 352 clockwise. The lug 353 of the bail 352 releases the slide 122, which is now displaced forward in addition to the slide 121, while the bail 352 restores rearward both the slide 159, and the slides 124 and 129 in the case these are released from the pins 332 and 340. Now the program shaft 27 when displaced from the station XVI is arrested under the control of the slide 122 at the station III instead of the station I, whereby a new sequence of operations is thus started. The station III causes the product previously calculated to be used on a multiplicand. Thereafter the program shaft 27 is displaced into the station VI, wherein the locking bail 154 (FIG. 1) does not lock the key 350, whereby, if the new product is to be used as a new multiplicand, the key 350 must be depressed again.

It is now assumed that the program shaft 27 is located in the station I, that the levers 337 and 342 (FIG. 13) are located in the central position and that the amount set up through the keyboard represents a dividend. Upon depressing the division key 326, the corresponding lever 325 (FIG. 6) through the link 147 rocks the bail 324 clockwise. The division slide 127 is now moved forward, while the slides 125 and 128 are locked by the pins 332 and 342 (FIG. 7) and the slide 126 (FIG. 6) is locked by the arm 344 of the sleeve 345. The stem 16 of the key 326 is now sensed by the bar 183 (FIG. 2), which starts the sequence of operations concerning the division.

The shaft 27 is firstly arrested in the station X which controls the set up of the division. Thereafter the key 300 (FIG. 3) may be depressed which causes the program shaft 27 to be displaced in the station XV. In this station the divisor is printed while the program shaft 27 is displaced to the station XVI, controlling the alignment of the divisor with the dividend. Thereafter the machne begins the division cycles. In the first one of these cycles the program shaft 27 is displaced to the station XVII, which controls the different functions of the division cycles. At the end of these cycles, the program shaft 27 is displaced to the station XVIII causing the quotient to be printed. The program shaft 27 is now displaced to the station XIX which causes the remainder to be printed, while the program shaft 27 is restored to the station I.

If the lever 337 (FIG. 7) is rocked clockwise before the depression of the key 326, the pin 332 of the lever 333 releases the slide 125. The program shaft 27 will now be arrested in the station XI in addition to the stations of the division sequence. In the station XI the shaft 27 controls the dividend accumulation in a machine totalizer. Similarly, if the lever 342 is rocked clockwise, the pin 340 of the lever 341 releases the slide 128. The program shaft 27 will now be arrested also in the station XX, which controls the quotient accumulation into another totalizer.

Finally, if at the beginning of the division the key 326

(FIG. 6) is depressed simultaneously with the percent key 349, the arm 344 of the sleeve 343 releases the slide 126, whereby the program shaft 27 is arrested also in the stations IV and V. In the station IV it causes the divisor to be additioned or subtracted to the amount stored in the register, while the program shaft 27 is displaced to the station V. In this station the dividend so obtained is printed, while the shaft 27 is shifted to the station X. Now the division may be started in the manner seen before.

Finally, upon depressing the transfer key 329 (FIG. 6), the corresponding lever 328 rocks the lever 327, thus releasing the slide 130, which causes the shaft 27 to be arrested in the stations II and I. In the station II, an amount stored in a register, for example a set up register, is transferred to another register or storing device, while the program shaft 27 is restored to the station I.

The control of some machine functions effected by the program control shaft 27 will now be described in detail.

Figures 8, 9:
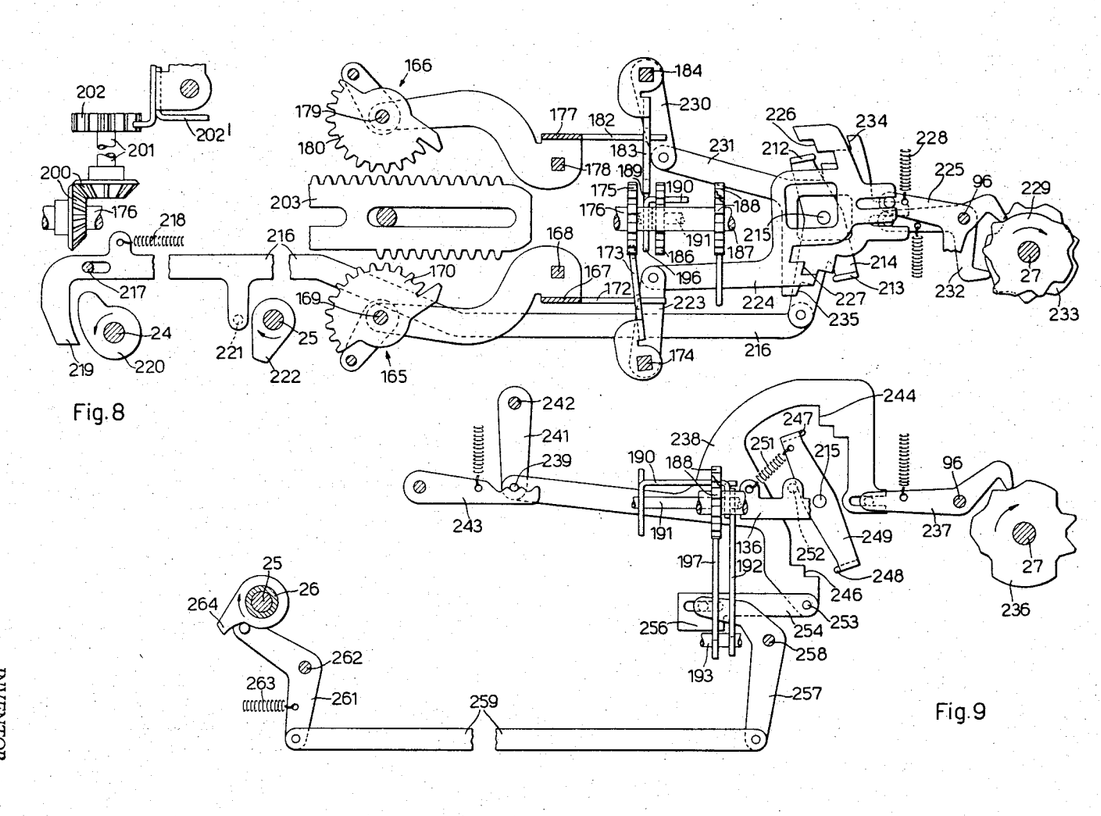
FIG. 8 is a partial sectional view according to the line VIII—VIII of FIG. 5.
FIG. 9 is a partial sectional view according to the line IX—IX of FIG. 5.

The calculating machine incorporating the program control device comprises two substantially symmetrical set up carriages 165 and 166 (FIG. 8). The carriage 165 comprises a bail 167 which is slidable on a square shaft 168 rotatably mounted on the machine frame, and is slidable on a shaft 169 vertically movable on said frame. The set up carriage 165 comprises a set of toothed sectors 170 mounted on the shaft 169 and adapted to be differentially set up order by order through a ten key keyboard not shown in the drawings, in the manner described in the United States patent application No. 398,915 filed on Sept. 24, 1964. The bail 167 is normally urged rightward by a spring 171 (FIG. 5) and is provided with a projection 172 engaging a notch of a rack 173 slidable on a square shaft 174 (FIG. 8). The rack 173 normally meshes with a pinion 175 secured to a shaft 176 (FIG. 10) adapted to be positively rotated clockwise for displacing step by step the rack 173 leftward upon setting up each order of an amount.

The carriage 166 (FIG. 8) comprises a bail 177 slidable on a square shaft 178 and on a shaft 179 mounting a set of sectors 180 settable through the same ten key keyboard. The bail 177 is urged rightward by a spring 181 (FIG. 5) and is provided with a projection 182 engaging a notch of a second rack 183 slidably mounted on a second square shaft 184 (FIG. 8). The rack 183 is adapted to mesh with a pinion 186 secured to a shaft 187 connected with the shaft 176 through a pair of similar gears 188 (FIG. 10), in order to displace the carriage 166 leftward step by step. Normally the gear 183 is locked by an arm 189 of a bail 190 pivoted at 191. The bail 190 is pin and slot connected with a lever 192 fulcrumed at 193 and normally urged by a spring 194 to contact a stationary stop 195. The bail 190 is provided with a second arm 196 adapted to lock the rack 173 (FIG. 8). A locking lever 197, also fulcrumed at 191 is urged by a spring 198 to contact the stop 195 and locks one of the gears 188 for preventing the shafts 176 and 187 from being rotated under the urge of the springs 171 and 181 (FIG. 5) of the carriage 165, and 166 respectively.

The shaft 176 is also connected through a pair of bevel gears 220 (FIG. 8) to a vertical shaft 201 carrying a pinion 202 meshing with a rack 202' transversely displaceable and normally pushed rightward by a spring not shown in the drawings. The rack 202' may cooperate alternately with two escapement members not shown in the drawings, which are associated with the carriages 165 and 166 to control the step by step displacement of the same rack 202'. The carriages 165 and 166 and the corresponding escapement members are selectable by angularly positioning a shaft 204 (FIG. 11) which is rotatably mounted on the machine frame. Particularly, the carriage 165 is selected when the shaft 204 is located in the position of FIG. 11, while the carriage 166 is selected when the shaft 204 is rotated clockwise. The shaft 204 substantially corresponds to the shaft 167, shown in the cited patent application No. 398,915.

Figures 10, 11:
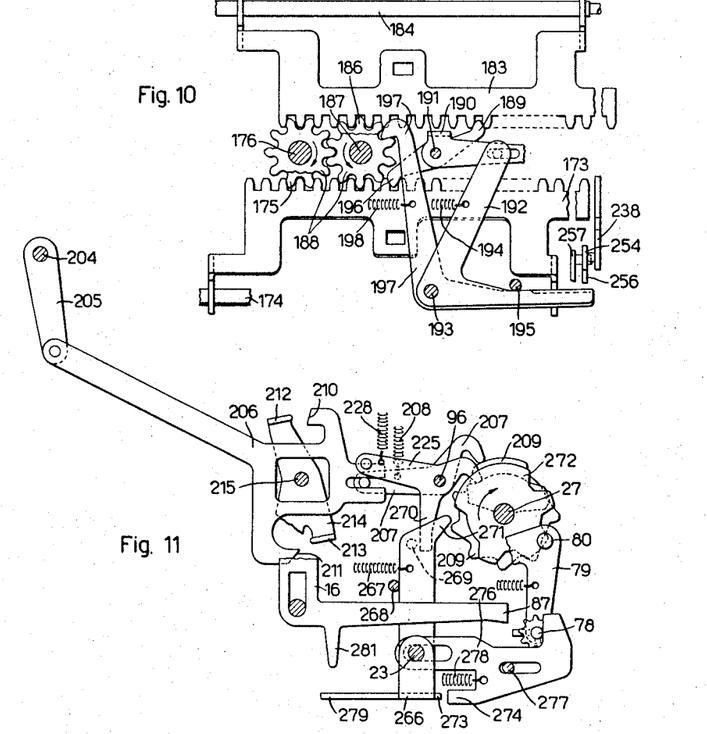
FIG. 10 is a partial sectional front view, according to the line X—X of FIG. 5.
FIG. 11 is a left hand partial longitudinal sectional view of a detail of the device.

The shaft 204 is secured to a crank lever 205 linked with a predisposing member formed of a link 206 pin and slot connected with a lever 207 fulcrumed on the shaft 96 and normally urged by a spring 208 to contact a cam 209 of the program shaft 27. The link 206 is provided with two projections 210 and 211 adapted to be alternately engaged by two corresponding lugs 212 and 213 of a lever 214 rotatably mounted on a stationary shaft 215.

The cam 209 normally presents to the lever 207 a raised edge as shown in FIG. 11, whereby the lever 207 holds the link 206 with the projection 210 into the path of the lug 212. The cam 209 may also present to the lever 207 a lower edge as to cause the lever 207 to raise the link 206, thus locating the projection 211 into the path of the lug 213. Linked with the lever 214 is a link 216 (FIG. 8) slidably mounted on a stationary pin 217 and normally urged by a spring 218 to contact same. The link 216 is provided with a projection 219 adapted to cooperate with a cam 220 of the servo-motor shaft 24. The link 216 is also provided with a pin 221 adapted to cooperate with a cam 222 of the auxiliary shaft 25. Therefore both cams 220 and 222 displace the link 216 rearward to rock the lever 214 clockwise in two different instances or phases of the machine operation. Particularly, the displacement caused by the cam 220 is useful in accumulating operations, as well as in total taking operations, the displacement caused by the cam 222 is useful in the set up cycles. In the accumulating operation the repeated displacement of the link 216 is normally without effect.

As long as the program shaft 27 is located in the station I as shown in FIG. 11, the cam 209 holds the link 206 with the projection 210 into the path of the lug 212. The clockwise rocking of the lever 214 does not affect the link 206, thus selecting the carriage 165. If the shaft 27 is located into a station wherein the cam 209 presents its lower edge to the lever 207, the lever 207 rocks the link 206 so as to bring its projection 211 into the path of the lug 213. In the following cycle of either the servo-motor shaft 24 (FIG. 8) or the auxiliary shaft 25, when the lever 214 is rocked clockwise, the lug 213 displaces the link 206 (FIG. 11) rearward. The crank lever 205 is now rocked clockwise bodily with the shaft 204, thus selecting the carriage 166. The shaft 204 will be restored to the position of FIG. 11 when the program shaft 27 will be located in a station wherein the cam 209 presents to the lever 207 its raised edge. Then the lever 207 restores the link 206 with the projection 210 into the path of the lug 212, whereby the link 206 will be displaced forward.

The transverse displacement of the carriages 165 and 166 is controlled by selectively engaging the racks 173 and 183 (FIG. 8) with the pinions 175, 186 and with the bail 190. This selective engagement is controlled irrespective from the selection of the corresponding carriage 165 or 166. In this manner both carriages 165, 166 may be simultaneously displaced by simultaneously meshing the two racks 173 and 183 with the pinions 175 and 186, whereas each carriage may be returned one or more steps by meshing the rack 173 with the pinion 186, or the rack 183 with the pinion 175.

To this end, secured to the square shaft 174 is a lever 223 linked with a predisposing member or link 224 pin and slot connected with a lever 225 fulcrumed on the shaft 96. The link 224 is provided with two complementary stepped edges 226 and 227 adapted to cooperate with the lugs 212, and 213 respectively, of the lever 214. The lever 225 is normally urged by a spring 228 to contact another cam 229 of the program shaft 27.

The cam 229 is adapted to locate the lever 225 into three different positions. In the station I of the program shaft 27 the lever 225 locates the link 224 in the raised position as shown in FIG. 8, whereby the lever 214 when rocked clockwise has no effect on the link 224.

The rack 173 remains still meshed with the pinion 175, ready for being advanced leftward.

When the shaft 27 is located into a station wherein the cam 229 rocks the lever 225 counterclockwise through its maximum stroke, the link 224 is displaced downward and is predisposed so as to be moved through a forward maximum stroke by the lever 214. Then the link 224 meshes the rack 173 with the pinion 186, whereby the carriage 165 is ready for being returned rightward step by step.

Finally, when the program shaft 27 is located into a station wherein the cam 229 sets the lever 225 into an intermediate position, the link 224 is predisposed so as to be longitudinally moved to an intermediate position by the lever 214. The link 224 engages the rack 173 with the arm 196 (FIG. 10) of the bail 190, whereby the rack 173 remains transversely locked thereby.

Similarly, secured to the square shaft 184 (FIG. 8) is an arm 230 linked with a link 231 pin and slot connected with a lever 232 cooperating with a cam 233 of the program shaft 27 adapted to locate the lever 232 in three different positions. The link 231 is provided with two complementary stepped edges 234 and 235 adapted to cooperate with the two lugs 212 and 213 of the lever 214. In correspondence with the three positions of the lever 232, the link 231 may locate the rack 183 in mesh with the pinion 186 for predisposing the leftward movement or with the pinion 175 for predisposing the rightward movement or in engagement with the arm 189 (FIG. 10) of the bail 190, as in the station I shown in FIG. 8 to prevent any transverse movement of the carriage 166.

The complete rightward return of the carriages 165 and 166, is controlled by another cam 236 (FIG. 9) of the program shaft 27 cooperating with a lever 237 pivoted on the shaft 96 and pin and slot connected with a predisposing member or link 238 fulcrumed on a pin 239. This latter is secured to a crank lever 241 fulcrumed at 242 and cooperates with a spring urged locking member 243. The link 238 is provided with two complementary stepped edges 244 and 246 adapted to cooperate with two lugs 247, respectively 248, of a second lever 249 pivoted on the shaft 215. The lever 249 is normally urged by a spring 251 to contact a pin 252 of the link 136.

Fulcrumed to the pin 253 of the link 238 is also a lever 254 having a projection 256 adapted to selectively cooperate with the levers 192 and 197 (FIG. 10). The lever 254 is pin and slot connected with another lever 257 (FIG. 9) fulcrumed at 258 and in turn connected through a link 259 to a lever 261. This lever is fulcrumed at 262 and is normally urged by a spring 263 to contact a cam 264 of the sleeve 26.

Figure 5:
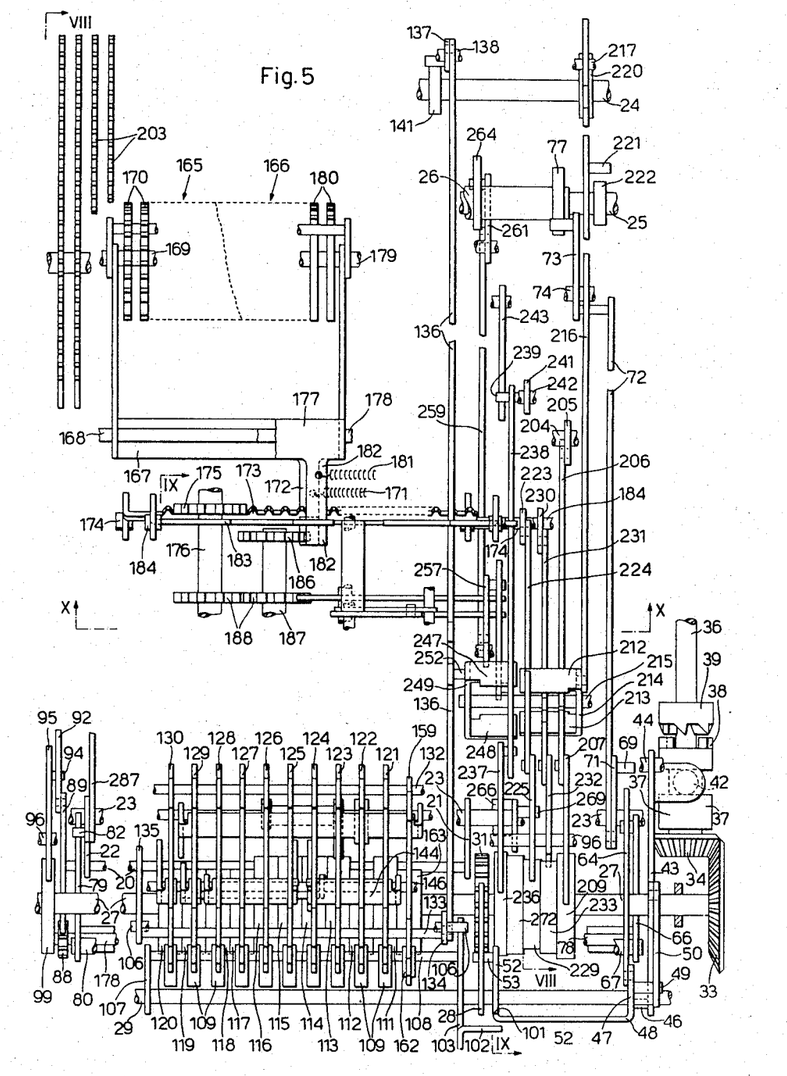
FIG. 5 is a partial plan view of the device.

The cam 236 of the program shaft 27 is adapted to locate the lever 237 in three different angular positions. When the program shaft 27 is located in the station I as shown in FIG. 9, the cam 236 holds the lever 237 in its intermediate position. Then the two lugs 247 and 248 do not affect the stepped edges 244 and 246 of the link 238, this latter being located in its intermediate longitudinal position. The lever 254 is thus held in the position of FIG. 9 with the projection 256 above the lever 197. In the second part of the cycle of the auxiliary shaft 25 and of the sleeve 26, the cam 264, through the lever 261, the link 259 and the lever 257, lowers the lever 254. Then the projection 256 rocks the lever 197 (FIG. 10) clockwise, thus releasing the gears 188, whereby the carriage 165 is restored rightward by the urge of its spring 171 (FIG. 5). If the shaft 27 is located in a station wherein the rack 183 (FIG. 8) meshes with the pinion 186 and wherein the lever 237 (FIG. 9) is still located in its intermediate position, the program device causes the spring 181 (FIG. 5) to restore the carriage 166 rightward.

If the program shaft 27 is located in a station wherein the cam 236 rocks the link 238 clockwise, at the beginning of the following cycle of the servo-motor shaft 24, the link 136 through the lever 249 displaces the link 238 forward, whereby the projection 256 is placed above both levers 192 and 197. In the same station the racks 173 and 183 must engage the bail 190. In the second part of the cycle of the auxiliary shaft 25, the lever 254 rocks now the two levers 192 and 197 (FIG. 10) clockwise. In turn the lever 192 rocks the bail 190 in the same direction to release the rocks 173 and 183, thus restoring the carriages 165 and 166 rightward. In turn the lever 197 releases the gear 188, whereby the rack 202' (FIG. 8) is restored rightward by its spring independently from the carriages 165 and 166.

It has been mentioned that during one machine operation the link 216 is operated in two successive instances or phases by the cam 220 of the servo-motor 24 and by the came 222 of the auxiliary shaft 25. The cam 222 operates the link 216 before the engagement of the clutch 38, 39 (FIG. 2) of the program shaft 27 controlled by the cam 77. The program control device comprises program altering means for selectively additionally displacing at least one predisposing member with a predetermined delay. Therefore, in the second phase of the machine operation the program may be altered to control specific machine functions. Particularly, said program altering means comprises a bail 266 (FIG. 11) rotatably mounted on the shaft 23 and normally urged by a spring 267 to contact a stationary stop 268. The bail 266 is provided with a pin 269 adapted to cooperate with a projection 270 of the lever 225, which predisposes the rack 173 (FIG. 8) of the carriage 165. The pin 269 may also cooperate with other levers predisposing similar functions, but not shown in the drawings.

The bail 266 (FIG. 11) is also provided with a projection 271 adapted to cooperate with a cam 272 of the program shaft 27, and it is provided with a second projection 273 adapted to cooperate with a lug 274 of a slide 276. This latter is slidably mounted on the shaft 23 and on a stationary pin 277 and is normally urged by a spring 278 to contact the left end of the shaft 78, the spring 278 prevailing over the two springs 267 and 228. Finally the bail 266 is provided with a set of lugs 279 (FIG. 13) each one adapted to cooperate with a projection 281 (FIG. 11) provided on the key stem 16. However, the lugs 279 are located only in correspondence with those key stems 16, which when depressed must exclude the operation of the bail 266.

If a key not requiring the program shaft 27 to be displaced is depressed, the projection 87 of its stem 16 prevents the shaft 78 from being displaced rearward, whereby the slide 276 does not not affect the bail 266. On the contrary, if a key requiring the program shaft 27 to be displaced is depressed, during the cycle of the servo-motor shaft 24, upon displacing rearward the link 236 (FIG. 8), the shaft 78 (FIG. 1) may be displaced rearward and releases the slide 276. Now the lug 274 of the slide 276 engages the projection 273 of the bail 266, which is thus urged clockwise.

In the case the program shaft 27 is located in a station wherein the program may be altered, the cam 272 presents a depression to the projection 271 of the bail 266. If under the projection 281 of the depressed key stem 16 no lug 279 is provided on the bail 266, this latter is rocked clockwise by the slide 276. Now the pin 269 engages the projection 270 of the lever 225 which is thus displaced from the position corresponding to the engagement of the rack 173 (FIG. 8) with the pinion 175, to the position corresponding to the engagement of the rack 173 with the bail 190. Therefore, in the second phase of the machine operation when the cam 222 of the auxiliary shaft 25 displaces the link 216 rearward, the rack 173 engages the bail 190 before the cam 77 (FIG. 2) displaces the program shaft 27 to the following station.

On the contrary, in the case the program shaft 27 is located in a station, wherein the program cannot be altered, the cam 272 through a raised portion prevents the bail 266 from being rocked clockwise. Similarly, if under the stem 16 of the depressed key a lug 279 is provided on the bail 266, this latter is prevented from being rocked by the projection 281 of the stem 16. It is thus apparent that the program altering means 266 is jointly controlled by the conditioning device 78, by the program shaft 27, and by the depressed key stem 16.

Figure 12:
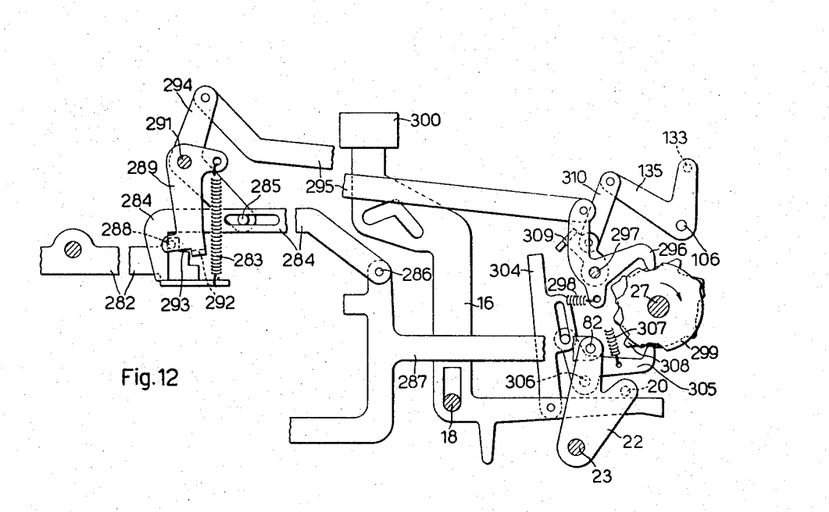
FIG. 12 is a left hand partial longitudinal sectional view of another detail of the device.

In a manner similar to that above explained for the various functions concerning the two set up carriages 165 and 166, the program shaft 27 is adapted to control the other machine functions by means of suitable cams. For example, as it has been described in the cited patent application, Ser. No. 506,958, the servo-motor shaft 24 is started by rocking a lever 282 (FIG. 12), the lever 282 being restored counterclockwise near the end of the cycle of the main shaft.

The lever 282 is urged by a spring 283 to contact a latch 284 slidably mounted on a pin 285 and linked at 286 with a slide 287 fulcrumed on the pin 82 of the lever 22. The latch 284 is urged by the spring 283 to contact a pin 288 of a lever 289 fulcrumed at 291 and provided with a lug 292 adapted to cooperate with a shoulder 293 of the lever 282, in order to prevent the lever 282 from being repeatedly rocked counterclockwise before restoring the universal bar 20. The pin 285 is secured to a lever 294 fulcrumed at 291 and connected through a link 295 to a lever 296. This latter is fulcrumed on a stationary shaft 297 and is normally urged by a spring 298 to contact a cam 299 of the program shaft 27.

If in a station of the program shaft 27 the cam 299 rocks the lever 296 counterclockwise, the link 295 rotates the lever 294 so as to raise the pin 285. The latch 284 is thus raised and no longer locks the lever 282 into the position of FIG. 12. Therefore, at the end of the second part of the cycle of the auxiliary shaft 25, when the universal bar 20 is restored and displaces the slide 287 forward, the latch 284 restores the lever 289 counterclockwise thus releasing the shoulder 293 of the lever 282 from the lug 292 and causing automatically a new cycle of the servo-motor shaft 24. The machine will then be stopped at the end of a machine operation, during which the program shaft 27 will be located in a station wherein the lever 296 is restored clockwise to the position of the FIG. 12.

Furthermore the program shaft 27 is adapted to select and control the automatic depression of some keys, for example the addition key 300, the subtraction key 301 (FIG. 13), the subtotal key 302 and the total key 303. To this end fulcrumed on each key stem 16 is a pawl 304 (FIG. 12) pin and slot connected with a corresponding lever 305 fulcrumed on the shaft 306. The lever 305 is normally urged by a spring 307 to contact a corresponding cam 308 of the program shaft 27. The various pawls 304 (FIG. 13) may cooperate with a bail 309 fulcrumed on the shaft 297 and connected through a link 310 (FIG. 12) with the lever 135 of the bar 133.

If in a station of the program shaft 27 one of the cams 308 rocks the corresponding lever 305 clockwise, this latter rocks the corresponding pawl 304 which is thus located into the path of the bail 309. During the following cycle of the servo-motor shaft 24, which in this case is automatically started in the manner above described, when the lever 135 is rocked counterclockwise, the link 310 rocks the bail 309 in the same direction. The bail 309 engages the rocked pawl 304, thus depressing the selected key stem 16, before the bar 20 is further displaced rearward, so as to engage same with the notch 19 of the corresponding lever 17 (FIG. 1).

In the cited patent application, Ser. No. 506,958, the cycles of the main shaft may be effected according to either of two different speeds. The speed of the main shaft is predisposed through a lever 311 (FIG. 14), which when located in the position of FIG. 14, predisposes the main shaft for being rotated at a lower speed, while when rocked counterclockwise it predisposes the main shaft for being rotated at a higher speed. The lever 311 is now connected through a link 312 with a lever 313 fulcrumed at 314. The lever 313 is pin and slot connected with a lever 315 fulcrumed at 316 and is provided with a projection 317 adapted to cooperate with the universal bar 20. The lever 315 is pin and slot connected with a lever 318 fulcrumed on the shaft 96 and is normally urged by a spring 319 to contact a cam 320 of the program shaft 27.

Figure 14:
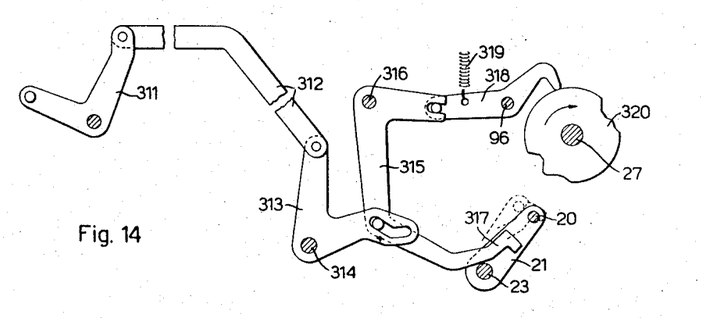
FIG. 14 is a sectional view of another detail of the device.

The cam 320 is adapted to locate the lever 318 in three different angular positions. In the position of FIG. 14, the lever 318 holds the lever 311 in the position corresponding to the lower speed of the main shaft. When the program shaft 27 is located in a station wherein the cam 320 causes the lever 318 to be rocked clockwise through its maximum stroke, the lever 315 brings its projection 317 to the position shown by broken lines in FIG. 14. The projection 317 lies thus into the return path of the bar 20 which has been previously rocked counterclockwise, whereby the return stroke of the bar 20 is prevented and machine operation is automatically started. Furthermore the lever 315 through the lever 313 and the link 312 rocks the lever 311 counterclockwise, whereby the main shaft will be started at higher speed.

Finally when the shaft 27 is located in a station wherein the cam 320 causes the lever 318 to be rocked clockwise in an intermediate position, the projection 317 of the lever 315 remains under the bar 20 and is unable to lock it, whereby the machine operation is not automatically started. However the lever 315 rocks the lever 313 and thus the lever 311 into the position corresponding to the higher speed of the main shaft.

The auxiliary cycles may be excluded for effecting repeated cycles of the sole main shaft under the control of another cam of the program shaft 27 irrespective from the cam 320.

It is intended that modifications, improvements and additions of parts may be made to the described program control device, without departing from the scope of the invention as defined by the appended claims.

What I claim is:

1. A program control device for a calculating or like machine, having a cam shaft adapted to be located in a plurality of operative angular stations to control in any station predetermined machine functions, and a cyclically operating mechanism, and comprising in combination:
   (a) a normally disengaged clutch for power rotating said shaft through said stations,
   (b) manually operable means for starting a sequence of machine operations,
   (c) a set of disks secured to said shaft and each one provided with a group of teeth angularly located according to a predetermined group of stations corresponding to said sequence,
   (d) a set of elements selectably associated with said disks and adapted to individually cooperate therewith for sequentially arresting said shaft each one in said predetermined group of stations,
   (e) a number of locking members each one normally locking a combination of said elements in an ineffective position,
   (f) manually operable means for starting a sequence of machine operations and for causing at least one of said locking members to release the corresponding combination of said elements to cooperate with the associated disks,
   (g) control means driven upon operation of one of said locking members for engaging said clutch,
   (h) and means for causing said elements when so released to sequentially arrest said disks and said support in the stations of all groups corresponding to the elements of said combination,
   (i) and means conditionable by each one of said elements upon arresting said shaft to disengage said clutch.

2. A program control device for a calculating or like machine, having a cam shaft adapted to be located in a plurality of operative angular stations to control in any station predetermined machine functions, and a cyclically operating mechanism, and comprising in combination:
(a) a normally disengaged clutch for rotating said shaft through said stations,
(b) manually operable means for starting a sequence of machine operations,
(c) control means driven by said cyclically operating mechanism upon operation of said operable means for engaging said clutch,
(d) a set of toothed members secured to said shaft and each one provided with a group of teeth located according to a predetermined group of stations corresponding to said sequence,
(e) a set of elements each one selectable for cooperating with one of said toothed members to sequentially arrest said shaft in said group of stations,
(f) means operated by said operable means for selecting a combination of said elements to sequentially arrest said shaft in the stations of all groups corresponding to the elements of said combination,
(g) and means conditionable by each one of said elements upon arresting said shaft to disengage said clutch.

3. A program control device for a calculating or like machine, having a cam shaft adapted to be located in a plurality of operative angular stations to control in any station predetermined machine functions, and a cyclically operating mechanism, comprising in combination:
(a) a normally disengaged clutch for power rotating said shaft through said stations,
(b) manually operable means for starting a sequence of machine operations,
(c) control means driven by said cyclically operating mechanism upon operation of said operable means for engaging said clutch,
(d) a set of toothed members secured to said shaft and each one provided with a group of teeth located according to a predetermined group of stations corresponding to said sequence,
(e) a set of elements each one selectable for cooperating with one of said toothed members to sequentially arrest said support in said group of stations,
(f) means operated by said manually operable means for selecting at least one of said elements to sequentially arrest said shaft in the stations of the group corresponding to a selected element,
(g) and means conditionable by said selected element upon arresting said shaft for disengaging said clutch.

4. A program control device according to claim 3, comprising:
(h) a common starting member operable for starting said mechanism,
(i) a set of manually depressible function control keys for operating said common starting member,
(j) a locking bar adapted to be displaced to different positions to selectively lock said keys,
(k) and a cam on said shaft for displacing said bar to said positions according to the stations of said shaft.

5. A program control device for a calculating or like machine having a cam shaft adapted to be located in a plurality of operative angular stations to control in any station predetermined machine functions, and a cyclically operating mechanism, comprising in combination:
(a) a normally disengaged clutch for power rotating said shaft through said stations,
(b) manually operable means for starting a sequence of machine operations,
(c) a conditioning device predisposable according to the station each time occupied by said shaft,
(d) control means conditioned by said conditioning device to be driven by said cyclically operating mechanism for engaging said clutch,
(e) a set of toothed members secured to said shaft and each one provided with a group of teeth located according to a predetermined group of stations corresponding to said sequence,
(f) a set of elements each one selectable for cooperating with one of said toothed members to sequentially arrest said support in said group of stations,
(g) means operated by said manually operable means for selecting at least one of said elements to sequentially arrest said shaft in the stations of the group corresponding to selected element,
(h) and means conditionable by said selected element upon arresting said shaft for disengaging said clutch.

6. A program control device according to claim 5, comprising:
(i) a common starting member operable for starting said mechanism,
(j) a set of manually depressible function control keys for operating said common starting member,
(k) and a sensing member comprised in said conditioning device and adapted to sense the depressed function control key for so conditioning said control means.

7. A program control device according to claim 6, comprising:
(l) at least two variably toothed bars mounted on said sensing member and selectable by said shaft for conditioning said control means according to said occupied station.

8. A program control device for a calculating or like machine having a cam shaft adapted to be located in a plurality of operative angular stations to control in any station predetermined machine functions, and a cyclically operating mechanism, comprising in combination:
(a) a normally disengaged clutch for power rotating said shaft through said stations,
(b) manually operable means for starting a sequence of machine operations,
(c) control means driven by said cyclically operating mechanism upon operation of said operable means for engaging said clutch,
(d) a set of toothed members secured to said shaft and each one provided with a group of teeth located according to a predetermined group of stations corresponding to said sequence,
(e) a set of elements each one selectable for cooperating with one of said toothed members to sequentially arrest said support in said group of stations,
(f) means operated by said manually operable means for selecting at least one of said elements to sequentially arrest said shaft in the stations of all groups corresponding to selected element,
(g) means conditionable by said selected element upon arresting said shaft for disengaging said clutch,
(h) a predisposing member for automatically controlling a corresponding machine function,
(i) a cam on said shaft for variably predisposing said predisposing member along a first direction,
(j) and means cyclically operable by said mechanism for variably moving said predisposing member in a second direction according to said predisposition.

9. A program control device according to claim 8, comprising:
(k) a common starting member for starting said mechanism,
(l) a set of manually depressible function control keys for operating said common starting member,
(m) a further member conditionable for automatically operating said starting member,
(n) and a further cam on said shaft for conditioning said further member.

10. A program control device according to claim 9, comprising:
(o) a selecting device conditionable by said shaft for selecting one of said keys,
(p) and means operable by said mechanism for automatically depressing the key so selected.

11. A program control device according to claim 8 comprising:
(k) program altering means controlled by said shaft for selectively additionally displacing said predisposing member in said first direction with a predetermined delay,
(l) and second means cyclically operable subsequently by said mechanism for additionally moving said predisposing member according to said additional displacement.

12. A program control device according to claim 8, comprising:
(k) a set of manually depressible function control keys for starting said mechanism,
(l) a conditioning device predisposable according to the station each time occupied by said shaft,
(m) control means conditioned by said conditioning device to be driven by said cyclically operating mechanism for engaging said clutch,
(n) means jointly controlled by the depressed key, by said conditioning device, and by said shaft for selectively additionally displacing in said first direction said predisposing member with a predetermined delay,
(o) and second means cyclically operable subsequently by said mechanism for additionally moving said predisposing member according to said additional displacement.

References Cited
UNITED STATES PATENTS

| | | | |
|---|---|---|---|
| 2,931,569 | 4/1960 | Gang | 235—63 |
| 2,936,952 | 5/1960 | Kiel et al. | 235—63 |
| 3,042,300 | 7/1962 | Anderson | 235—62 |
| 3,116,873 | 1/1964 | Trumpelmann et al. | 235—63 |
| 3,263,915 | 8/1966 | Englund et al. | 235—60 |
| 3,263,916 | 8/1966 | Baldus et al. | 235—60 |
| 3,286,919 | 11/1966 | Metschnabel et al. | 235—60 |

STEPHEN J. TOMSKY, *Primary Examiner.*